United States Patent
Ding et al.

(10) Patent No.: US 8,507,407 B2
(45) Date of Patent: Aug. 13, 2013

(54) MULTI-APERTURE CARBON GRANULE AIR PURIFICANT AND PRODUCTION METHOD

(71) Applicant: Zhejiang Jianzhong Bamboo Industry Co., Ltd., Zhejiang (CN)

(72) Inventors: Jianzhong Ding, Zhejiang (CN); Mengyao Ding, Zhejiang (CN)

(73) Assignee: Zhejiang Jianzhong Bamboo Industry Co., Ltd., Zhejiang (CN)

( * ) Notice: Subject to any disclaimer, the term of this patent is extended or adjusted under 35 U.S.C. 154(b) by 0 days.

(21) Appl. No.: 13/774,747

(22) Filed: Feb. 22, 2013

(65) Prior Publication Data

US 2013/0178358 A1 Jul. 11, 2013

Related U.S. Application Data

(63) Continuation of application No. PCT/CN2011/078807, filed on Aug. 24, 2011.

(30) Foreign Application Priority Data

Aug. 24, 2010 (CN) .......................... 2010 1 0265493

(51) Int. Cl.
*C01B 31/08* (2006.01)
(52) U.S. Cl.
USPC ............................ 502/417; 502/401; 502/526
(58) Field of Classification Search
USPC .................. 502/417, 416, 401, 439, 526, 506
See application file for complete search history.

(56) References Cited

U.S. PATENT DOCUMENTS 4,954,469 A 9/1990 Robinson

FOREIGN PATENT DOCUMENTS

| CN | 101391109 A | 3/2009 |
| CN | 101623621 A | 1/2010 |
| CN | 101947433 A | 1/2011 |

OTHER PUBLICATIONS (Translated pages provided for) International Search Report mailed Dec. 1, 2011 for parent PCT/CN2011/078807; references cited herein (translated abstracts enclosed).

*Primary Examiner* — Edward Johnson
(74) *Attorney, Agent, or Firm* — Olive Law Group, PLLC

(57) ABSTRACT

This invention provides a multi-aperture carbon granule air purificant and production method thereof, and belongs to the technical field of air purification. The air purificant is made from carbon powder, attapulgite, sepiolite, zeolite, cationic surfactant, pore-forming agent, and bamboo vinegar. The rational design that carbon powder (including plant carbon and activated carbon) of the air purificant mentioned above is treated with nano minerals, attapulgite, sepiolite, zeolite and so on, improves plant carbon adsorption capacity (over 5 folds) and activated carbon adsorption capacity (over 2 folds). Moreover it has additional bactericidal and antibacterial actions besides for the effects of cationic surfactant and bamboo vinegar. Compared with other adsorbents under current techniques, this air purificant still holds high adsorption capacity even at high temperature and low partical pressure of adsorbates, and maintains the function of plant carbon's releasing anion and far infrared at the meantime.

14 Claims, No Drawings

MULTI-APERTURE CARBON GRANULE AIR PURIFICANT AND PRODUCTION METHOD

CROSS-REFERENCE TO RELATED APPLICATIONS

This application is a continuation of Patent Cooperation Treaty Application No. PCT/CN2011/078807, filed on Aug. 24, 2011, which claims priority to Chinese Patent Application No. CN201010265493.3, filed on Aug. 24, 2010, the entire contents of both of which are hereby incorporated by reference herein.

FIELD OF THE INVENTION

This invention belongs to the technical field of air purificant, and relates to a multi-aperture carbon granule air purificant and production method thereof.

DESCRIPTION OF RELATED ART

Plant carbon, especially bamboo carbon, has functions of certain moisture abosorption as well as the release of far infrared and anion, which makes it a good material for environmental protection and health protection. However, it owns very weak capacity of absorbing organic pollutants such as toluene and xylene, and chemical contaminants such as ammonia, sulfur dioxide and carbon monoxide in the air, which limits the applications. There are higher requirements for adsorbing materials to control indoor environmental pollution, especially with serious air pollution nowadays.

The capacity of activated carbon adsorbing toxic and hazardous organics and chemical contaminants is above 5-6 times higher than plant carbon as activated carbon is also produced through activation and pickling besides for carbonization, which is the only process currently adopted for plant carbon. Therefore the activity of plant carbon is very weak and the air adsorption capacity is very poor. The micro-pore surface area of activated carbon people are familiar with is greatly improved after carbonization, activation, acid pickling and dipping processes. The activity usually mentioned is applied to expand micro-pore surface area for its better adsorption capacity, with steam rising at high temperature and high pressure. Toxic and hazardous materials like formaldehyde, benzene, ammonia, sulfides and carbides can float in the air, since their molecular sizes are close to water molecule, which requires the absorbing material capturing those toxic and hazardous ones with corresponding aperture The crystal apertures of nano minerals such as attapulgite, sepiolite and natural zeolites are substantially between 0.3-1.2 nm. The diameters of toxic and hazardous molecules are between 6.8-2.7 Ang and the micropore size of activated carbon is about 1.2 nm, making the activated carbon micro-pores capture them efficiently. However, plant carbon is different. Take bamboo carbon for example: although volatile organics of bamboo are burned during carbonization, a certain amount of ashes and volatile organics still remains in pores after carbonization without activation, acid pickling and dipping process due to incomplete combustion. The apertures of pores left after the bamboo is carbonized are generally larger than that of micro-pores and meso-pores, leaving only a handful of micropores. This is why plant carbon can absorb moisture and water efficiently, but hard to absorb both water in the air and toxic and hazardous materials.

SUMMARY OF THE INVENTION

To solve existing technical problems, the purpose of this invention is to support and provide a multi-aperture carbon granule air purificant with lower cost and stronger absorption capacity, and the technical proposal of production method.

The multi-aperture carbon granule air purificant, wherein the purificant is made from the compositions of following weight ratios:

30-70 parts of carbon powder, 10-40 parts of attapulgite, 10-25 parts of sepiolite, 5-10 parts of zeolite, 0.5-3 parts of cationic surfactant, 2-12 parts of pore-forming agent and 5-10 parts of bamboo vinegar.

The multi-aperture carbon granule air purificant, wherein the purificant is made from the compositions of following weight ratios:

35-65 parts of carbon powder, 15-35 parts of attapulgite, 15-20 parts of sepiolite, 7-9 parts of zeolite, 1-2 parts of cationic surfactant, 4-10 parts of pore-forming agent and 6-8 parts of bamboo vinegar.

The multi-aperture carbon granule air purificant, wherein the said carbon powder is 200-400 mesh plant carbon powder (including bamboo carbon powder, grass carbon powder, or charcoal powder), or activated carbon powder.

The multi-aperture carbon granule air purificant, wherein the said zeolite is one or two of chabasite and clinoptilolite.

The multi-aperture carbon granule air purificant, wherein the mentioned cationic surfactant is 1227 surfactant.

The multi-aperture carbon granule air purificant, wherein the said pore-forming agent is sulfate pore-forming agent, while the sulfate comprises sodium sulfate, potassium sulfate or aluminum sulfate.

The production method of multi-aperture carbon granule air purificant, wherein the method includes the following steps:

1) Take and weigh carbon powder, attapulgite, sepiolite, zeolite, cationic surfactant, pore-forming agent, and bamboo vinegar;

2) Mix attapulgite, sepiolite and zeolite of the said weight ratios and crush them into less than 200 mesh granules;

3) Add the carbon powder of said weight ratios into the mixture obtained in step 2), and evenly stir them;

4) Add the pore-forming agent aqueous solution of said weight ratios into the mixture obtained in step 3) for granulation and pore formation, and sprinkle the aqueous solution containing cationic surfactant and bamboo vinegar of said weight ratios into the mixture;

5) Dry the granules until the water content reaches 10-15%;

6) Calcinate the granules into finished products.

The production method of multi-aperture carbon granule air purificant, wherein the purities of attapulgite, sepiolite and zeolite are greater than 80%.

The production method of multi-aperture carbon granule air purificant, wherein the granules are dried at 80-100° C. in step 5).

The production method of multi-aperture carbon granule air purificant, wherein the granules are calcinated at 200-300° C. for 1-3 hours in step 6).

The attapulgite, sepiolite, zeolite and 1227 surfactant are existing products that can be purchased on market.

The said carbon powder including plant carbon powder or activated carbon powder can be prepared through conventional methods.

The rational design that carbon powder (including plant carbon and activated carbon) of above air purificant is treated with nano minerals, attapulgite, sepiolite, zeolite and so on, improves plant carbon adsorption capacity (over 5 folds) and activated carbon adsorption capacity (over 2 folds). Moreover it has additional bactericidal and antibacterial actions in addition to the effects of cationic surfactant and bamboo vinegar. Compared with other adsorbents under existing techniques, this air purificant still holds high adsorption capacity even at high temperature and low partical pressure of adsorbates, and maintains the function of plant carbon's releasing anion and far infrared at the meantime. Moreover, the hard and non-dusty granules generated do not harm any contacted objects and human being.

DETAILED DESCRIPTION

This invention is specifically described in the following Embodiments. The parts mentioned in this invention are weight parts.

Embodiment 1

1) 30 parts of 325 mesh bamboo carbon powder, 40 parts of attapulgite, 25 parts of sepiolite, 5 parts of chabasite, 0.5 part of 1227 surfactant, 2 parts of sodium sulfate pore-forming agent, and 5 parts of bamboo vinegar are taken and weighted, wherein the purities of said attapulgite, sepiolite and zeolite are over 80%;

2) Mix attapulgite, sepiolite and zeolite of the said weight ratios and crush them into less than 200 mesh granules;

3) Add the carbon powder of said weight ratio into the mixture obtained in step 2), and evenly stir them;

4) Add the pore-forming agent sulfate aqueous solution of said weight ratios the mixture obtained in step 3) for granulation and pore formation, and the aqueous solution containing cationic surfactant and bamboo vinegar of said weight ratios is sprinkled into the mixture;

5) Dry the granules at 100° C. until the water content reaches 10-15%;

6) The granules are calcinated at 300° C. for 3 hours to obtain the finished multi-aperture carbon granule air purificant with the diameter of 0.1-8 mm.

The tests show that, with bactericidal and antibacterial functions, the capacity of finished products absorbing organic pollutants like toluene and xylene as well as chemical contaminants including ammonia, sulfur dioxide and carbon monoxide, is higher than that of common activated carbon. Under the same conditions as Embodiment 1, the same technical effect can be also realized with the replacement of bamboo carbon powder with charcoal powder, grass carbon powder and activated carbon powder.

Embodiment 2

1) Take and weigh 40 parts of 400 mesh bamboo carbon powder, 30 parts of attapulgite, 20 parts of sepiolite, 5 parts of clinoptilolite, 5 parts of chabasite, 3 parts of 1227 surfactant, 12 parts of aluminum sulfate pore-forming agent, and 8 parts of bamboo vinegar;

2) Mix attapulgite, sepiolite and zeolite of the said weight ratios and crush them into less than 200 mesh granules;

3) Add the carbon powder of said weight ratios into the mixture obtained in step 2), and evenly stir them;

4) Add the pore-forming agent sulfate aqueous solution of said weight ratios into the mixture obtained in step 3) for granulation and pore formation, and sprinkle the aqueous solution containing cationic surfactant and bamboo vinegar of said weight ratios into the mixture;

5) Dry the granules at 90V until the water content reaches 10-15%;

6) Calcinate the granules at 250V for 2.5 hours to obtain the finished multi-aperture carbon granule air purificant with the diameter of 0.1-8 mm.

The tests show that, with bactericidal and antibacterial functions, the capacity of finished products absorbing organic pollutants like toluene and xylene as well as chemical contaminants including ammonia, sulfur dioxide and carbon monoxide, is higher than that of common activated carbon. Under the same conditions as Embodiment 2, the same technical effect can be also realized with the replacement of bamboo carbon powder with charcoal powder, grass carbon powder and activated carbon powder.

Embodiment 3

1) Take and weigh 70 parts of 200 mesh bamboo carbon powder, 10 parts of attapulgite, 10 parts of sepiolite, 10 parts of clinoptilolite, 1 part of 1227 surfactant, 5 parts of potassium sulfate pore-forming agent, and 10 parts of bamboo vinegar;

2) Mix attapulgite, sepiolite and zeolite of the said weight ratios and crush them into less than 200 mesh granules;

3) Add the carbon powder of said weight ratio into the mixture obtained in step 2), and evenly stir them;

4) Add the pore-forming agent sulfate aqueous solution of said weight ratio with the concentration of 50% into the mixture obtained in step 3) for granulation and pore formation, and sprinkle the aqueous solution containing surfactant and bamboo vinegar of said weight ratios into the mixture;

5) Dry the granules at 80V until the water content reaches 10-15%;

6) Calcinate the granules at 300° C. for 3 hours to obtain the finished multi-aperture carbon granule air purificant with the diameter of 0.1-8 mm.

The tests show that, with bactericidal and antibacterial functions, the capacity of finished products absorbing organic pollutants like toluene and xylene as well as chemical contaminants including ammonia, sulfur dioxide and carbon monoxide, is higher than that of common activated carbon.

We claim:

1. A multi-aperture carbon granule air purificant, wherein the purificant is made from the compositions of the following weight ratios: 30-70 parts of carbon powder, 10-40 parts of attapulgite, 10-25 parts of sepiolite, 5-10 parts of zeolite, 0.5-3 parts of cationic surfactant, 2-12 parts of pore-forming agent, and 5-10 parts of bamboo vinegar.

2. The multi-aperture carbon granule air purificant according to claim 1, wherein the purificant is made from the compositions of the following weight ratios: 35-65 parts of carbon powder, 15-35 parts of attapulgite, 15-20 parts of sepiolite, 7-9 parts of zeolite, 1-2 parts of cationic surfactant, 4-10 parts of pore-forming agent, and 6-8 parts of bamboo vinegar.

3. The multi-aperture carbon granule air purificant according to claim 1, wherein the carbon powder is 200-400 mesh plant carbon powder that is one of bamboo carbon powder, grass carbon powder, and charcoal powder), or the carbon powder is activated carbon powder.

4. The multi-aperture carbon granule air purificant according to claim 1, wherein the zeolite is one or two of chabasite and clinoptilolite.

5. The multi-aperture carbon granule air purificant according to claim 1, wherein the cationic surfactant is 1227 surfactant.

6. The multi-aperture carbon granule air purificant according to claim 1, wherein the pore-forming agent is sulfate pore-forming agent and the sulfate comprises at least one of sodium sulfate, potassium sulfate and aluminum sulfate.

7. A method of producing multi-aperture carbon granule air purificant according to claim 1, wherein the method includes the following steps:

a) weighing carbon powder, attapulgite, sepiolite, zeolite, cationic surfactant, pore-forming agent, and bamboo vinegar;
b) mixing attapulgite, sepiolite and zeolite of said weight ratios and crush them into less than 200 mesh granules;
c) adding the carbon powder of said weight ratio into the mixture obtained in step b), and evenly stir them;
d) adding the pore-forming agent aqueous solution of said weight ratios into the mixture obtained in step c) for granulation and pore formation, and sprinkle the aqueous solution containing cationic surfactant and bamboo vinegar of said weight ratios into the mixture;
e) drying the granules until the water content reaches 10-15%; and
f) calcinating granules into finished products.

8. The production method of multi-aperture carbon granule air purificant according to claim 7, wherein the purities of attapulgite, sepiolite and zeolite are greater than 80%.

9. The production method of multi-aperture carbon granule air purificant according to claim 7, wherein drying the granules until the water content reaches 10-15% comprises drying the granules at 80-100 degrees Celsius.

10. The production method of multi-aperture carbon granule air purificant according to claim 7, wherein calcinating the granules comprises calcinating the granules at 200-300 degrees Celsius for between one and three hours.

11. A method of producing multi-aperture carbon granule air purificant according to claim 2, wherein the method includes the following steps:

a) weighing carbon powder, attapulgite, sepiolite, zeolite, cationic surfactant, pore-forming agent, and bamboo vinegar;
b) mixing attapulgite, sepiolite and zeolite of said weight ratios and crush them into less than 200 mesh granules;
c) adding the carbon powder of said weight ratio into the mixture obtained in step b), and evenly stir them;
d) adding the pore-forming agent aqueous solution of said weight ratios into the mixture obtained in step c) for granulation and pore formation, and sprinkle the aqueous solution containing cationic surfactant and bamboo vinegar of said weight ratios into the mixture;
e) drying the granules until the water content reaches 10-15%; and
f) calcinating granules into finished products.

12. The production method of multi-aperture carbon granule air purificant according to claim 11, wherein the purities of attapulgite, sepiolite and zeolite are greater than 80%.

13. The production method of multi-aperture carbon granule air purificant according to claim 11, wherein drying the granules until the water content reaches 10-15% comprises drying the granules at 80-100 degrees Celsius.

14. The production method of multi-aperture carbon granule air purificant according to claim 11, wherein calcinating the granules comprises calcinating the granules at 200-300 degrees Celsius for between one and three hours.

* * * * *